US008881768B2

(12) United States Patent
Haines et al.

(10) Patent No.: US 8,881,768 B2
(45) Date of Patent: Nov. 11, 2014

(54) FLUID FLOW CONTROL DEVICES AND SYSTEMS, AND METHODS OF FLOWING FLUIDS THERETHROUGH

(75) Inventors: Bradford Haines, Spanish Fork, UT (US); Gifford Decker, Springville, UT (US); Mark Haehl, Alpine, UT (US)

(73) Assignee: Flowserve Management Company, Irving, TX (US)

( * ) Notice: Subject to any disclaimer, the term of this patent is extended or adjusted under 35 U.S.C. 154(b) by 673 days.

(21) Appl. No.: 12/473,007

(22) Filed: May 27, 2009

(65) Prior Publication Data

US 2010/0300542 A1 Dec. 2, 2010

(51) Int. Cl.
*F16K 47/08* (2006.01)

(52) U.S. Cl.
CPC ..................................... *F16K 47/08* (2013.01)
USPC .......................... 137/625.33; 251/127; 138/42

(58) Field of Classification Search
USPC ............. 137/625.3, 625.33, 625.37; 251/127; 138/40, 42
See application file for complete search history.

(56) References Cited

U.S. PATENT DOCUMENTS

| | | | | | |
|---|---|---|---|---|---|
| 3,688,800 | A | * | 9/1972 | Hayner et al. | 138/42 |
| 4,105,048 | A | * | 8/1978 | Self | 138/42 |
| 4,127,146 | A | * | 11/1978 | Self | 137/625.3 |
| 4,335,744 | A | * | 6/1982 | Bey | 137/522 |
| RE31,570 | E | | 5/1984 | Drexel | |
| 4,593,446 | A | * | 6/1986 | Hayner | 29/890.09 |
| RE32,197 | E | * | 7/1986 | Self | 251/127 |
| 4,600,152 | A | * | 7/1986 | Samueli | 239/542 |
| 4,938,450 | A | * | 7/1990 | Tripp et al. | 251/30.03 |
| 6,039,076 | A | * | 3/2000 | Hemme et al. | 137/625.37 |
| 6,095,196 | A | * | 8/2000 | McCarty et al. | 138/42 |
| 6,244,297 | B1 | * | 6/2001 | Baumann | 137/625.3 |
| 6,701,957 | B2 | * | 3/2004 | McCarty et al. | 137/625.3 |
| 6,782,920 | B2 | * | 8/2004 | Steinke | 137/625.3 |
| 6,935,370 | B2 | * | 8/2005 | McCarty et al. | 137/625.3 |
| 7,089,961 | B2 | | 8/2006 | Morton et al. | |
| 2003/0188787 | A1 | | 10/2003 | Steinke | |
| 2004/0168730 | A1 | | 9/2004 | McCarty et al. | |
| 2006/0191584 | A1 | | 8/2006 | Haines | |
| 2007/0028977 | A1 | | 2/2007 | Goulet | |

FOREIGN PATENT DOCUMENTS

| | | |
|---|---|---|
| CN | 1427931 A | 7/2003 |
| FR | 1546358 A | 11/1968 |
| WO | 0169114 A1 | 9/2001 |
| WO | 2007074342 A1 | 7/2007 |
| WO | 2008032078 A1 | 3/2008 |

OTHER PUBLICATIONS

International Search Report and Written Opinion for International Application No. PCT/US2009/045344, mailed Mar. 3, 2010, 9 pages.

(Continued)

*Primary Examiner* — John Fox
(74) *Attorney, Agent, or Firm* — TraskBritt, P.C.

(57) ABSTRACT

Fluid flow control devices comprise a body including a central aperture extending along a longitudinal axis therethrough and a plurality of channels extending from an outer sidewall of the body to an inner sidewall of the body. At least one first channel may intersect at least one other channel. Fluid flow control systems, methods of forming fluid flow control devices, and methods of flowing a fluid through a fluid flow control device are also disclosed.

14 Claims, 6 Drawing Sheets

(56) References Cited

OTHER PUBLICATIONS

International Preliminary Report on Patentability for International Application No. PCT/US2009/045344, mailed Nov. 29, 2011, 6 pages.
Emerson Process Management Instruction Manual, Design CAV4 Control Valve, Oct. 2006.
Masoneilan Dresser Catalogue No. 386, Vannes VRT, Vanes anti-cavitation avex clapet/siege a resistance variable pour pressions differentielles elevees.
Genuine DRAG Only by CCI, 4 pages.
Emerson Process Management Product Bulletin, Cavitrol III One-, Two-, and Three-Stage Trims, Feb. 2008.
Extended EP Search Report for European Patent Application No. 09845340, dated Feb. 28, 2013.

* cited by examiner

US 8,881,768 B2

FLUID FLOW CONTROL DEVICES AND SYSTEMS, AND METHODS OF FLOWING FLUIDS THERETHROUGH

TECHNICAL FIELD

The present disclosure relates generally to fluid flow control devices. More particularly, embodiments of the present disclosure relate to devices configured reduce a pressure and energy of a fluid passing therethrough.

BACKGROUND

In many areas of industry, it is often necessary to reduce the pressure and energy of fluids (both liquids and gases) within a pipeline. One or more control devices may be employed for this purpose. Various designs for control devices have been presented in the art. For example, a device may be employed to divide the flow through the device into a plurality of separate streams configured as a plurality of tortuous fluid flow paths within the device. As fluid passes through the tortuous fluid flow paths, the fluid is caused to change direction many times. Furthermore, as the fluid travels through the tortuous fluid flow paths, the overall cross-sectional area of the fluid flow path may increase to provide a decrease in the velocity of the fluid within the flow path. The fluid pressure and energy of the fluid is partially dissipated along such paths as a result of losses caused by friction between walls of the path, rapid changes in fluid direction and expansion or contraction chambers. These devices may include what are commonly referred to as "tortuous path trim devices."

Fluid flow control devices may conventionally take the form of a stack of disks or a plurality of concentric cylindrical sleeves. In the former design, a plurality of substantially planar disks is stacked on top of one another to provide a hollow, cylindrical structure. Such structures are commonly referred to as "valve trim disk assemblies." Each disk generally includes a plurality of voids formed through the disk. The disks are aligned and stacked together such that a plurality of continuous, tortuous fluid paths are provided by the voids in the disks that extend from the central region of the hollow, cylindrical valve trim disk assembly to the exterior of the valve trim disk assembly. In the latter design, the sleeves are radially perforated with the perforations of adjacent sleeves being offset to cause the fluid to flow in a tortuous path. The sleeves are separated by intermediate annular passages which allow the fluid passing therethrough to expand before it then has to contract to pass through the perforations of the next sleeve. The specific geometric arrangement of such designs is configured to allow the pressure of the fluid of each stream to drop in relatively small increments and in many stages.

A fluid flow control device is often provided within a body of a valve, such as a control valve, having a body that is conventionally configured to direct the fluid from an inlet towards the hollow, cylindrical fluid flow control device. The valve also may be configured to direct fluid passing through the fluid flow control device to the exterior thereof towards a fluid outlet. The valve includes a piston, ball, disk or other device configured to be inserted into a central region of the valve to interrupt fluid flow through and close the valve.

Pressurized fluids contain stored mechanical potential energy. The fluid flow control device dissipates this energy by reducing the pressure and velocity of the fluid. As the fluid flows through the fluid pathways, the fluid flow may be turbulent. Turbulent fluid has associated pressure and velocity fluctuations that act upon the structural elements of the pipes and fluid control devices in which the fluid is flowing. These pressure and velocity fluctuations are generally accompanied by other problems such as erosion, noise, vibration and cavitation. In many applications, these accompanying problems are undesirable or unacceptable characteristics of a fluid flow control device.

BRIEF SUMMARY

Various embodiments of the present disclosure comprise fluid flow control devices. In one or more embodiments, a fluid flow control device may comprise a body that includes a central aperture therethrough extending along a longitudinal axis thereof. At least one first channel may extend from an outer sidewall of the body to an inner sidewall of the body. At least one second channel may extend from the outer sidewall of the body to the inner sidewall of the body and intersect the at least one first channel.

In one or more additional embodiments, a fluid flow control device may comprise a body that includes a plurality of disks coupled axially together along a longitudinal axis. At least one disk of the plurality of disks may comprise a plurality of grooves in a surface thereof extending from an outer diameter to an inner diameter of the at least one disk and configured so that at least two of the plurality of grooves intersect.

Additional embodiments of the present disclosure comprise fluid flow control systems. One or more embodiments of such systems may comprise a fluid inlet and a fluid flow control device positioned in relation to the fluid inlet so that a fluid passing from the fluid inlet flows through the fluid flow control device. The fluid flow control device may comprise at least one first channel extending from an outer sidewall of a body to an inner sidewall of a central aperture extending through the body. At least one second channel may extend from the outer sidewall of the body to the inner sidewall of the body and intersect the at least one first channel.

Other embodiments comprise methods for forming a fluid flow control device. One or more embodiments of such methods may comprise forming at least a first groove in a surface of at least one disk. The at least a first groove may extend from an outer diameter of the at least one disk to an inner diameter thereof. At least another groove may be formed in the surface of the at least one disk extending from the outer diameter to the inner diameter of the at least one disk and intersecting the at least a first groove. The at least one disk may be coupled to at least another disk.

In yet further embodiments, the disclosure comprises methods for flowing a fluid through a fluid flow control device. In one or more embodiments of such methods, a fluid may be flowed through a channel that extends between an outer surface of a body and an inner surface of an aperture extending through the body. Fluid may also be flowed through at least one second channel that extends between the outer surface and the inner surface of the body and that intersects at least a portion of the channel. The fluid flowing through the channel may be impinged into the fluid flowing through the at least one second channel.

DETAILED DESCRIPTION

The illustrations presented herein are, in some instances, not actual views of any particular fluid flow control device, seat retainer, or control valve, but are merely idealized representations which are employed to describe the present disclosure. Additionally, elements common between figures may retain the same numerical designation.

Figure 1:
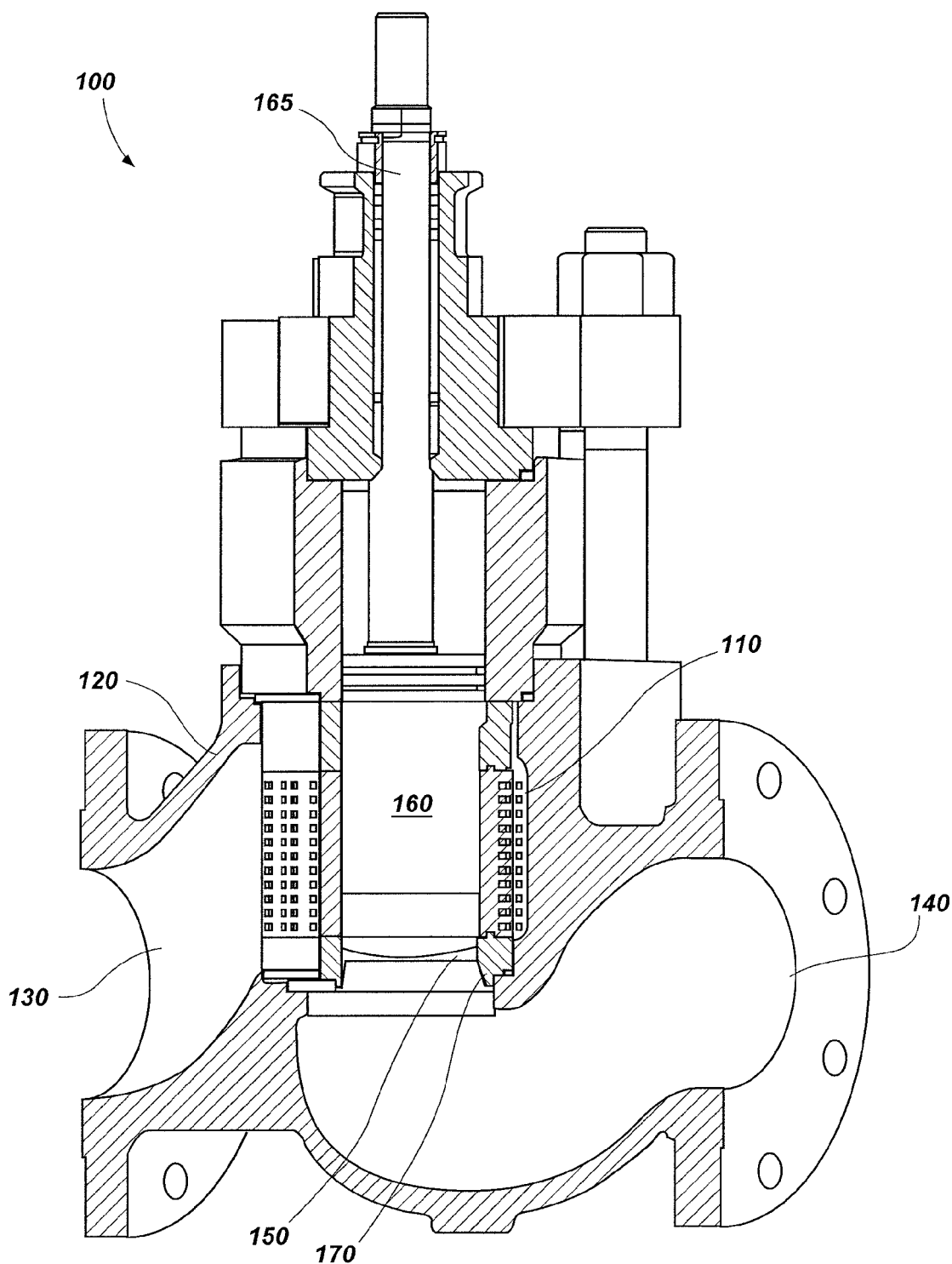
FIG. 1 illustrates a cross-sectional view of a fluid flow control system comprising a valve assembly that includes a fluid flow control device according to at least one embodiment.

Various embodiments of the present disclosure comprise fluid flow control devices. FIG. 1 illustrates a cross-sectional view of a fluid flow control system comprising a valve assembly 100 that includes a fluid flow control device 110 according to at least one embodiment. The valve assembly 100, which may also be characterized as a control valve, comprises a valve body 120 defining a fluid inlet 130 and a fluid outlet 140, which in use may be connected to pipes (not shown) that transport fluid to and from the valve assembly 100. Although the valve assembly 100 is shown with an inlet 130 and an outlet 140, the valve assembly 100 may be employed in uses in which the fluid flow is reversed. The direction of fluid flow may be selected according to the particular application.

A plug chamber 150 may be positioned between the fluid inlet 130 and the fluid outlet 140 and a plug head 160 may be disposed therein. The plug head 160 is coupled to a shaft 165 and is configured to move within the plug chamber 150 between a fully open position and a closed position. In the open position, the plug head 160 is retracted to provide fluid communication between the fluid inlet 130 and the fluid outlet 140, allowing fluid to flow from the fluid inlet 130 to the plug chamber 150 and into the fluid outlet 140. In the closed position, the plug head 160 is in abutment with a valve seat 170, forming a seal that physically interrupts fluid communication between the fluid inlet 130 and the fluid outlet 140, and effectively blocks fluid flow through the valve body 120.

The shaft 165 may include an actuator controllably coupled thereto and configured to control the position of the plug head 160. The actuator may comprise any suitable actuator known to those of ordinary skill in the art. In addition, a positioner may be operably coupled to the actuator. The positioner may comprise any conventional positioner suitable for use with the selected actuator as is known to those of ordinary skill in the art.

As illustrated in the embodiments depicted in FIG. 1, the fluid flow control device 110 may be configured as a seat retainer disposed on the valve seat 170 and in the plug chamber 150. The fluid flow control device 110 is positioned and configured so that all the fluid passing through the valve body 120 flows through the fluid flow control device 110.

Figure 2:
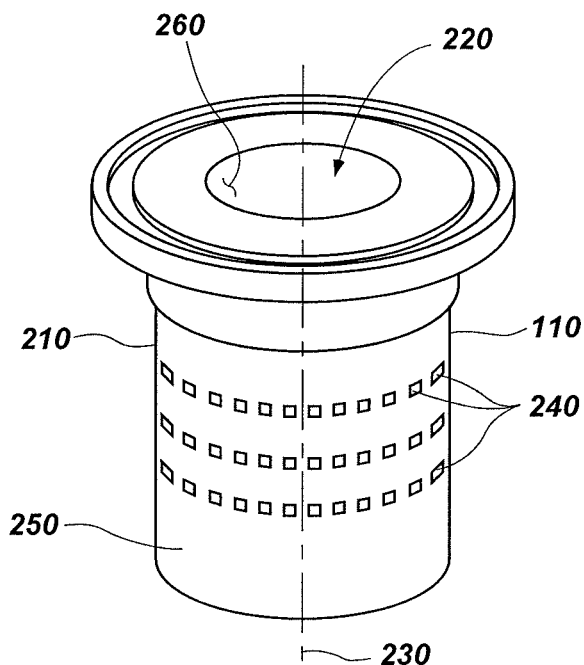
FIG. 2 illustrates an isometric view of the fluid flow control device of FIG. 1 according to one or more embodiments.

FIG. 2 illustrates an isometric view of the fluid flow control device 110 of FIG. 1 according to one or more embodiments. The fluid flow control device 110 comprises a body 210 having a central aperture 220 extending therethrough along a longitudinal axis 230 of the body 210. The body 210 includes a plurality of channels 240 extending between and in communication with an outer surface 250 and an inner surface 260 of the body 210. At least one channel 240 is configured to intersect at least another channel 240.

Figure 3:
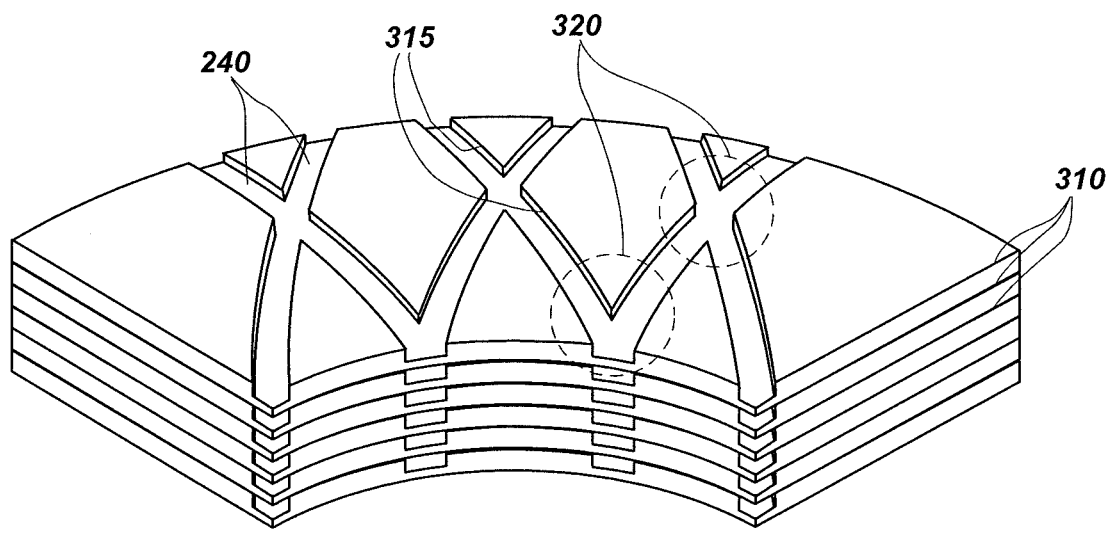
FIG. 3 is a perspective view of a cut-away section of the fluid flow control device comprised of two or more disks

In at least one embodiment, the body 210 of the fluid flow control device 110 may comprise a plurality of substantially planar disks stacked adjacent to one another. FIG. 3 is a perspective view of a cut-away section of the fluid flow control device 110 (FIGS. 1 and 2) comprised of two or more disks 310. At least one disk 310 comprises two or more channels 240 extending radially from the outer diametric extent to the inner diametric extent of the disk 310. At least one channel 240 is configured to intersect at least one other channel 240.

Figure 3A:
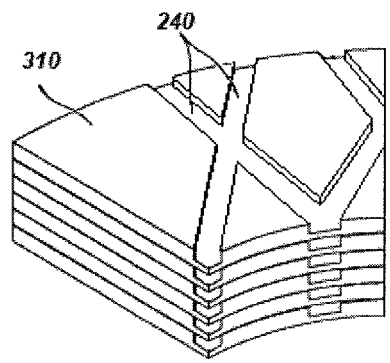
FIG. 3A is a perspective view of a cut-away section of the fluid control device comprised of two or more disks having liner channels.

In other embodiments, the two or more channels 240 may comprise grooves formed in a surface of a disk 310 and comprising sidewalls extending at least substantially perpendicular to the surface. The channels 240 may extend nonlinearly over the surface of the disk 310 in at least some embodiments. For example, in at least some embodiments the channels 240 may extend substantially arcuately over the surface of the disk 310. In other embodiments, the channels 240 may extend substantially linearly over the surface of the disk 310, as shown in FIG. 3A. The channels 240 may be configured with a selected angle of intersection between two channels 240 to customize the effects of the intersections.

Figure 3B:
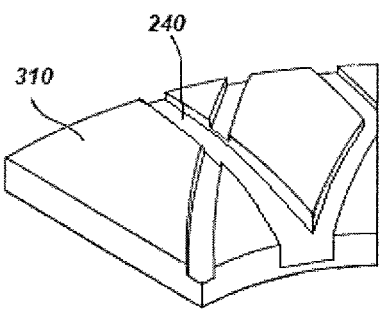
FIG. 3B is a perspective view of a disk having a channel that varies by width and depth.

In some embodiments, the channels 240 may comprise a substantially constant width and depth, while in other embodiments the channels 240 may comprise a varying width, depth or a combination thereof. For example, FIG. 3B shown a disk 310 having a channel 240 that varies in both width and depth. The width and/or depth of the channels 240 may be varied to customize the location of pressure drops through the channels 240 and may be configured based on the particular application. Furthermore, the depth of the channels 240 may be selected according to the particular application and configuration of the particular fluid flow control device.

Referring to FIG. 3, each of the two or more channels 240 may be configured to intersect at least one other channel 240, the intersections comprising energy reduction stages 320. The number of stages 320 can be determined by the number of intersections and may be selected based on the particular application. For example, in some embodiments, each channel 240 may comprise a single stage 320. In other embodiments, each channel 240 may comprise a plurality of stages 320. By way of example and not limitation, each channel may comprise between one and seven stages 320. The number of stages 320 may exceed seven in other embodiments.

The channels 240 may be configured to intersect the outer surface 250, the inner surface 260, as well as another channel 240 at a particular angle. The angle of intersection may be selected to maximize the effects on the fluid passing through the fluid flow control device 110 and may differ according to the particular application. Furthermore, at least some of the angles of intersection between various stages 320, the outer surface 250, and the inner surface 260 may differ for a single channel 240. For example, in embodiments comprising arcuate channels 240, the angle of intersection at the outer surface 250, at a first stage 320, at one or more additional stages 320, and at the inner surface 260 may each comprise a different value.

The fluid flow control device 110 may comprise any of a variety of materials depending on the particular application. By way of example and not limitation, embodiments of fluid flow control devices 110 of the present disclosure may comprise a metal or metal alloy, such as steel, a ceramic, or other suitable material. In embodiments comprising a plurality of disks 310, channels 240 may be formed and the disks 310 may be disposed adjacent each other and secured in position, as will be described in more detail below.

Figure 4:
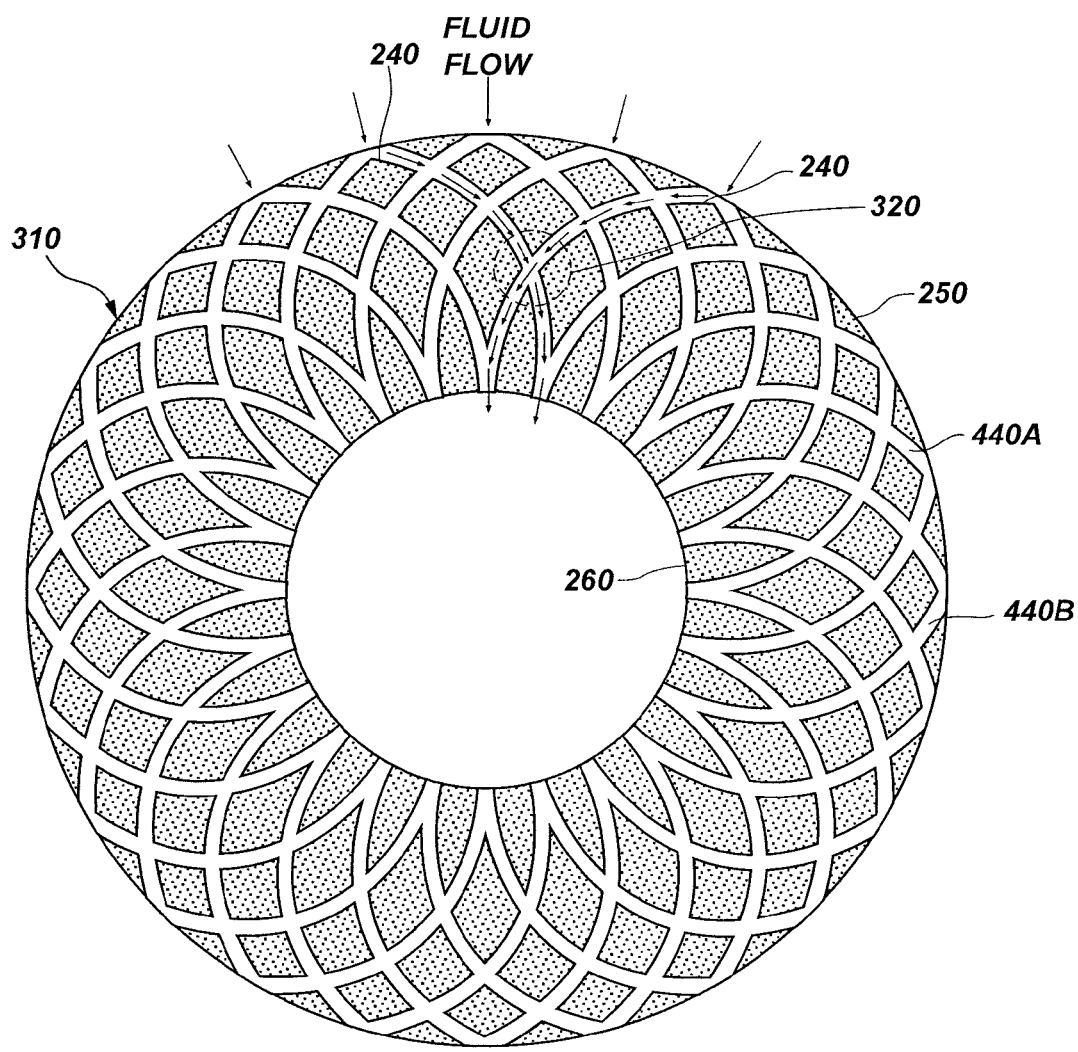
FIG. 4 is a plan view of a disk comprising a plurality of arcuate channels according to at least one embodiment and illustrating a fluid flow through some of the channels.

FIG. 4 is a plan view of a disk 310 comprising a plurality of arcuate channels 240 according to at least one embodiment and illustrating a fluid flow through some of the channels 240. A fluid may be flowed between the outer surface 250 and the inner surface 260 of the fluid flow control device 110 (FIG. 1). In FIG. 4, the fluid flow is shown as flowing from the outer surface 250 to the inner surface 260, known as a "flow over" design. However, in other embodiments, the fluid flow may be configured to flow from the inner surface 260 to the outer surface 250, known as a "flow under" design, depending on the particular application.

Fluid flows through the plurality of channels 240, which extend between the outer surface 250 and the inner surface 260. Each channel 240 intersects one or more other channels at stages 320. For example, in the embodiment depicted by FIG. 4, each channel comprises four stages. As the fluid flows through each channel 240, the fluid in each channel 240 impinges the fluid from one or more other channels 240 at the stages 320. At the points of impingement (i.e., at each stage 320) the fluid in the two intersecting channels 240 is forced to fit simultaneously through an area comprising a width of a single channel 240. In other words, twice the fluid volume is forced to flow through the width of a single channel 240, resulting in a sudden contraction of the area through which the fluid may flow. As the fluid continues into one of the two intersection channels 240, the fluid experiences a sudden expansion of the area through which the fluid may flow, as compared to the area relating to the intersection. The sudden contraction and expansion of the area through which the fluid flows results in reducing the pressure of the fluid flowing therethrough. The fluid may subsequently exit the channel 240 at a lower pressure than the pressure at which the fluid entered the channel 240.

Additional embodiments of the present disclosure comprise methods of forming fluid flow control devices. Embodiments of such methods are described with reference to FIGS. 1-5. As set forth hereinabove, at least some embodiments of a fluid flow control device 110 of the present disclosure may comprise a plurality of substantially planar disks 310 stacked adjacent to one another. The disks 310 may be formed with a substantially round shape and including a central aperture 220 formed therein. The thickness of the disks 310 may be selected in accordance with the particular application. By way of example only, at least some embodiments may employ disks 310 comprising a thickness selected of about 0.125 in. and 0.5 inch (approximately 3.175 mm and 12.7 mm). In other embodiments, the disks 310 may comprise a thickness greater than 0.5 inch (12.7 mm).

Fluid passageways in the form of channels 240 may be formed into the disk 310. In at least some embodiments, the channels 240 may be formed using a cutter to cut the channels 240 into the disk 310. By way of example and not limitation, the cutter may comprise a hole saw, which may be suitable for forming arcuate channels 240, or a rotary saw, which may be suitable for forming substantially linear channels 240. The cutter may plunge partway into the disk 310 to a selected depth without cutting completely through the disk 310. A single cut with a cutter, such as a hole saw, may form two channels 240 at the same time. For example, a single cut with a hole saw may form the channels 440A and 440B in FIG. 4. At least two channels 240 may be formed in the surface of the disk 310 that intersect at some point to form a stage 320.

Figure 4A:
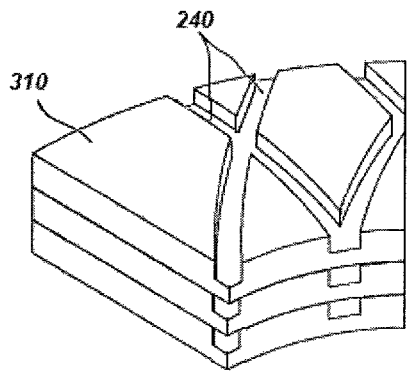
FIG. 4A is a perspective view of a cut-away section of the fluid control device comprised of three or fewer disks having channels with a greater depth than the channels shown in FIG. 3.

The depth of the channels 240 may vary depending on the particular application and the thickness of the disks 310. For example, a thinner disk 310 will only allow for more shallow channels 240, while a relatively thick disk 310 will allow for much deeper channels 240. In at least one embodiment, as shown in FIG. 4A. only one to three substantially thick disks 310 may be employed and thick channels 240 may be formed therein. Such a thick disk 310 with deep channels 240 may be suitable for various applications, such as a valve having only "on" or "off" capabilities.

Figure 4B:
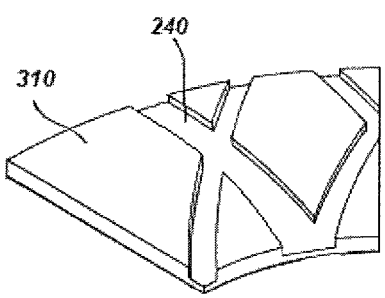
FIG. 4B is a perspective view of a disk having a channel with a greater width than the channels shown in FIG. 3.

The width of the channels 240 may also vary according to the particular application, as shown in FIG 4B. Typically, the width of the channels 240 may be determined by the thickness of the cutter used to form the channels 240. However, a channel 240 that is wider than the thickness of the cutter may be formed by plunging the cutter two or more times into the surface of the disk 310 at nearly the same location.

The disks 310 may be disposed adjacent to each other and secured in place. The disks 310 may be disposed so that the surface of one disk 310 with the channels 240 therein is positioned adjacent to the surface of another disk 310 having no channels 240 therein. In other embodiments, the disks 310 may be disposed so that the surface of one disk 310 having channels 240 therein is positioned adjacent to the surface of another disk 310 also having channels 240 therein. In various configurations of such embodiments, the channels 240 in each surface may be oriented substantially aligned or partially offset, such as the fluid passageways taught in U.S. Patent Publication No. 2006/0191584, the entire disclosure of which is incorporated in its entirety herein.

In some embodiments, the disks 310 may include through holes (not shown) formed between the channels 240 and bolts or pins (not shown) may be employed through the through holes for aligning and securing the disks 310 together. In other embodiments, the stack of disks 310 may be secured by an adhesive or by brazing or welding the disks 310 together. In embodiments in which the disks 310 comprise ceramic materials, the disks 310 may be secured to one another using techniques known to those of ordinary skill in the art for securing ceramic materials together.

Figure 5:
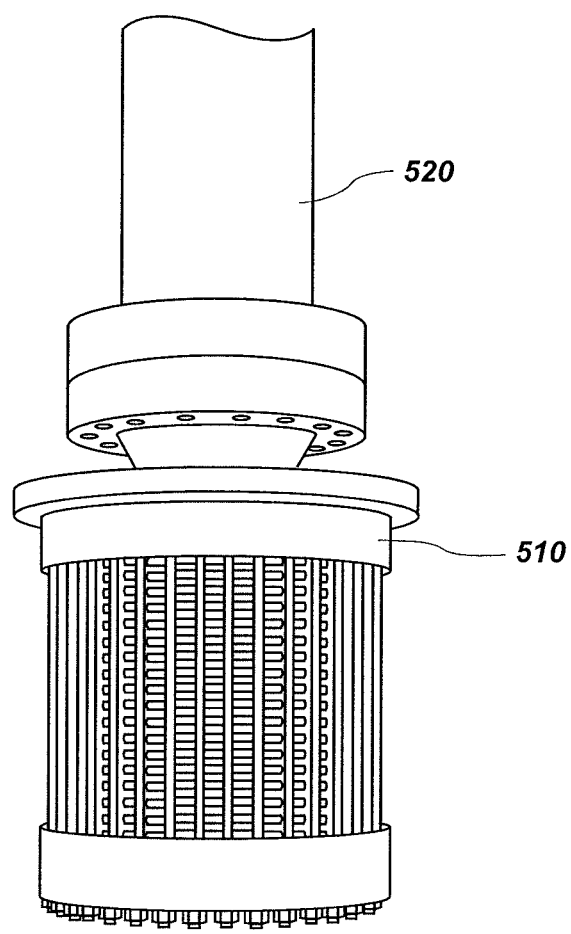
FIG. 5 is an elevational view of a fluid flow control device employed in a fluid flow control system according to one embodiment.

Although the disclosure has described embodiments of a fluid flow control device 110 employed in a valve, the invention is not so limited. Various embodiments of fluid flow control devices of the present disclosure may be employed in various applications for reducing the pressure and/or energy of a fluid flowing through a system. FIG. 5 is an elevational view of a fluid flow control device 510 employed in a fluid flow control system according to one embodiment. The fluid flow control device 510 may be coupled to a fluid inlet, such as pipe 520, at one longitudinal end and may be closed at the opposing longitudinal end. Fluid flowing through the pipe 520 may enter a central aperture of the fluid flow control device 510 and may pass through a plurality of channels 240 (FIG. 2-4) to the exterior. Such a fluid flow control device 510 may be employed in various applications, such as, but not limited to, flowing a fluid into a fluid tank, flowing a fluid into a river or other fluid stream, an exhaust system for releasing a fluid into the surrounding environment, or flowing fluid from the pipe 520 into another pipe.

While certain embodiments have been described and shown in the accompanying drawings, such embodiments are merely illustrative and not restrictive of the scope of the disclosure, and this disclosure is not limited to the specific constructions and arrangements shown and described, since various other additions and modifications to, and deletions from, the described embodiments will be apparent to one of ordinary skill in the art. Thus, the scope of the disclosure is only limited by the literal language, and legal equivalents, of the claims which follow.

What is claimed is:

1. A fluid flow control device, comprising:
a body comprising a central aperture therethrough extending along a longitudinal axis thereof;
at least one first channel extending from an outer sidewall of the body to an inner sidewall of the body at a first continuous, uniform direction; and
at least one second channel extending from the outer sidewall of the body to the inner sidewall of the body at a second continuous, uniform direction and intersecting the at least one first channel, wherein two intersecting channels fit simultaneously through an area having an approximate width of a single channel, wherein the at least one first channel and the at least one second channel extend at least substantially linearly from the outer sidewall to the inner sidewall of the body.

2. The fluid flow control device of claim 1, wherein the body comprises a plurality of disks stacked adjacent to one another.

3. The fluid flow control device of claim 1, wherein the at least one first channel intersects a plurality of other channels.

4. The fluid flow control device of claim 3, wherein at least some of the angle of intersections between the at least one first channel and the plurality of other channels are different.

5. A fluid flow control device, comprising:
a body comprising a plurality of disks coupled axially together along a longitudinal axis, wherein at least one disk of the plurality of disks comprises a plurality of grooves in a surface thereof, each groove of the plurality of grooves extending from an outer diameter to an inner diameter of the at least one disk, wherein at least one groove of the plurality of grooves intersects one or more other grooves of the plurality of grooves at corresponding one or more stages, each stage of the corresponding one or more stages being configured to contract fluid flow by forcing fluid flowing through two intersecting grooves of the plurality of grooves to fit simultaneously through the stage, the at least one groove of the plurality of grooves being bounded by parallel groove sidewalls extending smoothly and continuously from the outer diameter to the inner diameter of the at least one disk, wherein the at least one groove has discontinuities only at the one or more stages.

6. The fluid flow control device of claim 5, wherein each groove of the plurality of grooves intersects at least one other groove of the plurality of grooves.

7. The fluid flow control device of claim 6, wherein each groove of the plurality of grooves intersects two or more other grooves of the plurality of grooves.

8. The fluid flow control device of claim 5, wherein the plurality of disks comprises a material selected from the group of materials consisting of metal, metal alloy, or ceramic.

9. A fluid flow control system, comprising:
a fluid inlet; and
a fluid flow control device positioned in relation to the fluid inlet so that a fluid passing from the fluid inlet flows therethrough, the fluid flow control device comprising:
at least one first channel having parallel channel sidewalls extending smoothly and directly from an outer sidewall of a body to an inner sidewall of a central aperture extending through the body; and
at least one second channel having parallel channel sidewalls extending smoothly and directly from the outer sidewall of the body to the inner sidewall of the body and intersecting the at least one first channel, wherein at least two intersecting channels fit simultaneously through an area having an approximate width of a single channel.

10. The fluid flow control system of claim 9, further comprising:
a valve body comprising a plug chamber positioned between the fluid inlet and a fluid outlet;
a plug head disposed in the plug chamber; and
wherein the fluid flow control device is configured as a seat retainer positioned in the plug chamber.

11. The fluid flow control system of claim 9, wherein the fluid flow control device is coupled to the fluid inlet at one longitudinal end and is closed at an opposing longitudinal end.

12. The fluid flow control system of claim 9, wherein the body comprises a plurality of substantially planar disks stacked adjacent to one another.

13. The fluid flow control system of claim 9, wherein the at least one first channel and the at least one second channel extend substantially linearly from the outer sidewall to the inner sidewall of the body.

14. A method of flowing a fluid through a fluid flow control device, comprising:
flowing a fluid through a first channel that extends along a first single straight line from an outer surface of a body to an inner surface of an aperture extending through the body;
flowing a fluid through at least one second channel that extends along a second single straight line from the outer surface of the body to the inner surface of the aperture, the at least one second channel intersecting the first channel, the first channel and the at least one second channel being bounded by parallel channel sidewalls extending smoothly and continuously from the outer surface of the body to the inner surface of the aperture; and
impinging the fluid flowing through the channel into the fluid flowing through the at least one second channel, wherein the intersecting channels fit simultaneously through an area having an approximate width of a single channel.

* * * * *